(12) United States Patent
Obermeyer

(10) Patent No.: US 9,403,470 B2
(45) Date of Patent: Aug. 2, 2016

(54) VEHICLE HOOK HOIST

(71) Applicant: James H. Obermeyer, Crown Point, IN (US)

(72) Inventor: James H. Obermeyer, Crown Point, IN (US)

( * ) Notice: Subject to any disclaimer, the term of this patent is extended or adjusted under 35 U.S.C. 154(b) by 0 days.

(21) Appl. No.: 14/532,046

(22) Filed: Nov. 4, 2014

(65) Prior Publication Data
US 2015/0132091 A1    May 14, 2015

Related U.S. Application Data

(60) Provisional application No. 61/903,473, filed on Nov. 13, 2013.

(51) Int. Cl.
*B60P 1/04* (2006.01)
*B60P 1/64* (2006.01)

(52) U.S. Cl.
CPC ..................... *B60P 1/6463* (2013.01)

(58) Field of Classification Search
CPC .................................................. B60P 1/6463
USPC ................. 414/491, 494, 498, 500
See application file for complete search history.

(56) References Cited

U.S. PATENT DOCUMENTS

| | | |
|---|---|---|
| 1,451,127 A | 4/1923 | Thornton |
| 2,621,819 A | 12/1952 | Terho et al. |
| 3,049,378 A | 8/1962 | Nelson |
| 3,074,574 A | 1/1963 | Prince |
| 3,130,847 A | 4/1964 | Dempster et al. |
| 3,138,276 A | 6/1964 | Allen et al. |
| 3,144,149 A | 8/1964 | Dempster et al. |
| 3,214,044 A | 10/1965 | Dempster et al. |
| 3,214,046 A | 10/1965 | Dempster et al. |
| 3,231,120 A | 1/1966 | Dempster et al. |
| 3,272,546 A | 9/1966 | Cooley |
| 3,302,808 A | 2/1967 | Herpich et al. |
| 3,376,987 A | 4/1968 | Lohse |
| 3,606,059 A | 9/1971 | Haberle |
| 3,841,505 A | 10/1974 | Kent |
| 3,957,166 A | 5/1976 | Durham |
| 4,410,207 A | 10/1983 | Scharf |
| 4,529,349 A | 7/1985 | Lutz |
| 4,645,405 A | 2/1987 | Cambiano |
| 4,704,063 A | 11/1987 | Updike et al. |
| 4,802,811 A | 2/1989 | Nijenhuis |
| 4,954,039 A | 9/1990 | Johnston et al. |
| 5,257,891 A | 11/1993 | Baumann et al. |
| 5,542,807 A | 8/1996 | Kruzick |
| 5,848,869 A | 12/1998 | Slocum et al. |
| 6,068,440 A | 5/2000 | Lang et al. |
| 6,332,746 B1 | 12/2001 | Lang et al. |
| 6,880,894 B2 | 4/2005 | Obermeyer |
| 7,112,030 B2 | 9/2006 | Renziehausen |
| 7,878,750 B2 * | 2/2011 | Zhou ............... B25J 5/007 414/498 |
| 8,043,043 B2 * | 10/2011 | Collins ............ B60P 1/6454 414/469 |
| 8,303,044 B2 | 11/2012 | Obermeyer |
| 8,444,365 B2 | 5/2013 | Duell |
| 2007/0092364 A1 | 4/2007 | Geise et al. |
| 2008/0219821 A1 | 9/2008 | Marmur |
| 2009/0202328 A1 | 8/2009 | Geise et al. |

* cited by examiner

*Primary Examiner* — Saul Rodriguez
*Assistant Examiner* — Willie Berry, Jr.
(74) *Attorney, Agent, or Firm* — Woodard, Emhardt, Moriarty, McNett & Henry LLP

(57) ABSTRACT

Disclosed is a vehicle-mounted lift system for use with a container that includes a frame, a carriage coupled to the frame which can move longitudinally along the frame, a first support attached to and extending above the carriage, an arm rotatably attached to the first support at an arm pivot point, a lifting hook attached to the arm that can engage a lifting hook on the container, and an actuator that can rotate the arm angularly about the pivot point to move the position of the lifting hook.

19 Claims, 14 Drawing Sheets

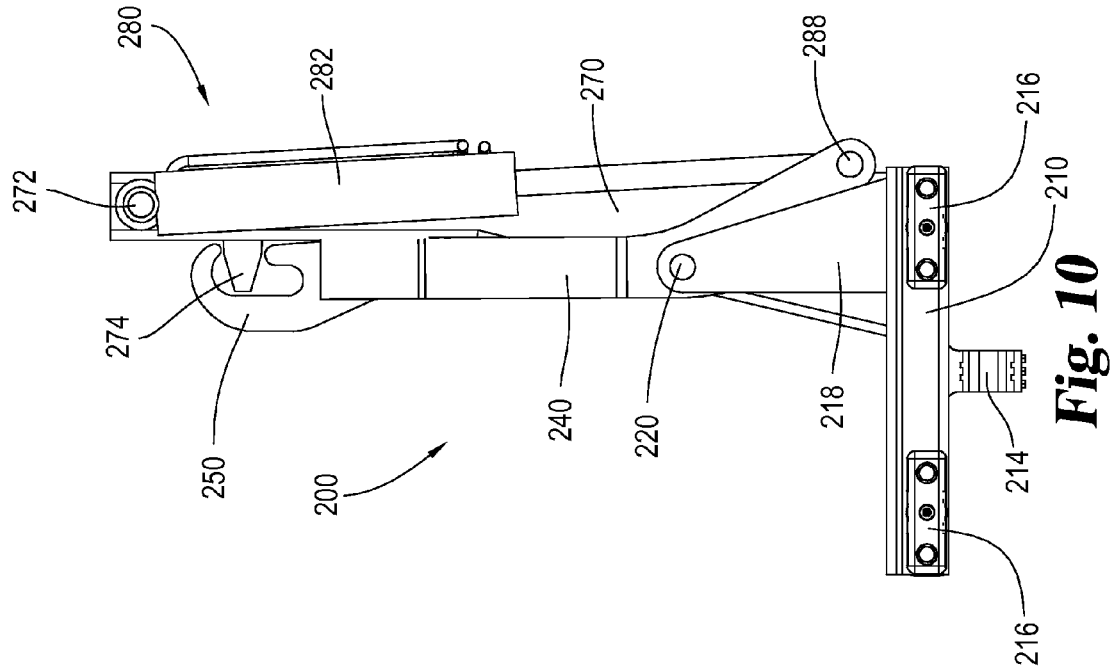
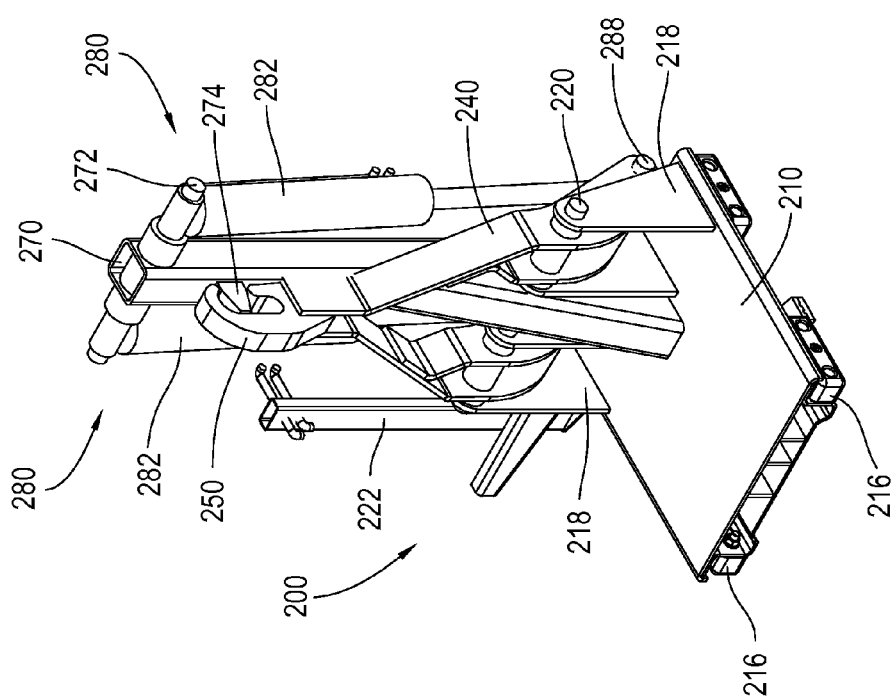

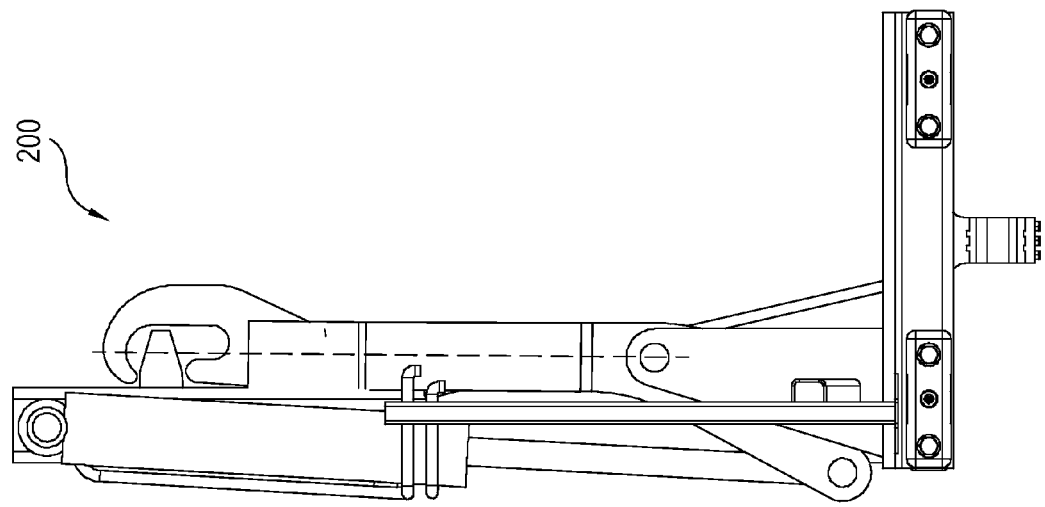
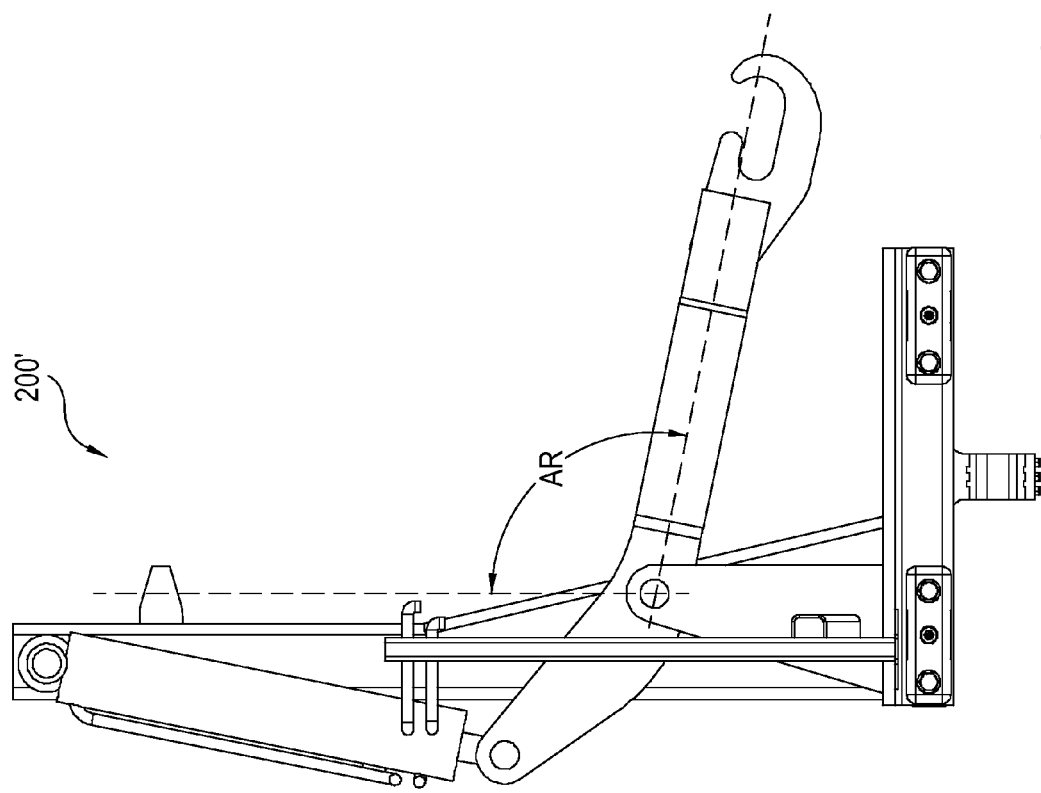
Fig. 17

VEHICLE HOOK HOIST

CROSS-REFERENCE TO RELATED APPLICATIONS

This application claims the benefit of U.S. Provisional Application No. 61/903,473, filed Nov. 13, 2013, which is hereby incorporated by reference.

BACKGROUND

This disclosure is related to vehicle mounted hook hoists for loading and unloading containers on and off a vehicle.

Trucks are used to load, transport, unload, and sometimes dump containers holding various types of material, for example, delivery, picking up and hauling refuse in an open or closed top container. These trucks may use lifts attached to the truck to assist in loading the containers onto the truck, holding the containers or part of the containers on the truck during transport, dumping the contents out of the containers, and assisting in offloading the containers from the truck. For example, the waste and recycling industries may use lifts attached to trucks to transport and dump waste and recycling containers (one example being the Dumpster® brand trash receptacle). One type of lift, commonly referred to as a cable hoist, uses a winch to pull a cable the operator has connected to a container and draw the container onto the truck. Tow trucks (also referred to as wreckers) may use cable hoists and a tilting flat bed to load and offload vehicles. Vehicle-mounted lifts can use a rigid hook assembly to connect with the container to be loaded, offloaded, and/or dumped.

BRIEF DESCRIPTION OF THE DRAWINGS

FIG. 9 is a perspective view of a carriage assembly, a component of the FIG. 4 frame.

FIG. 10 is a side elevational view of the FIG. 9 carriage assembly.

FIG. 17 includes two side elevational views of the FIG. 9 carriage assembly illustrating the range of motion of the arm assembly.

DESCRIPTION OF THE ILLUSTRATED EMBODIMENTS

Figure 1:
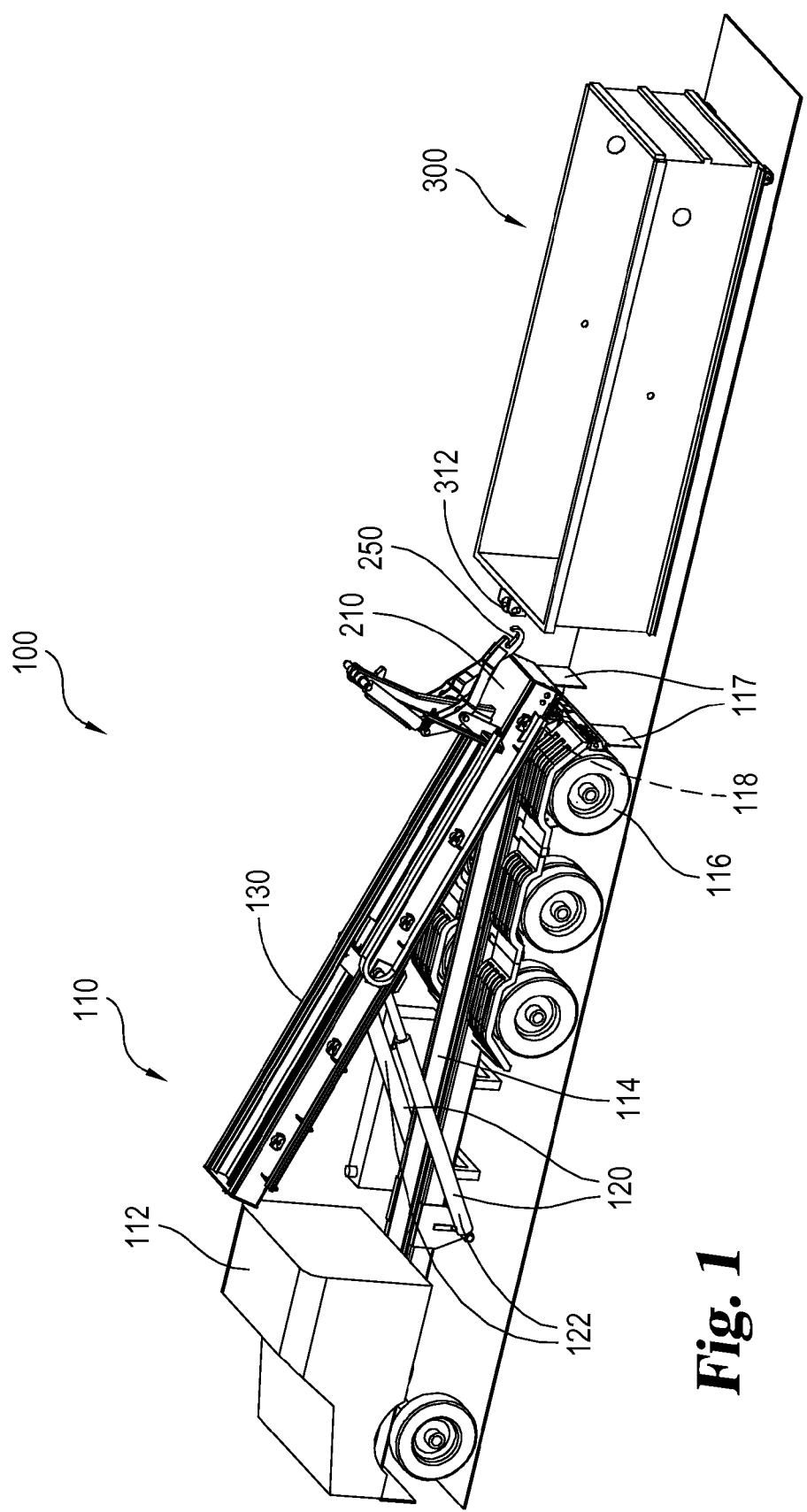
FIG. 1 is a perspective view of a vehicle mounted lift system showing a vehicle and a container.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Figure 2:
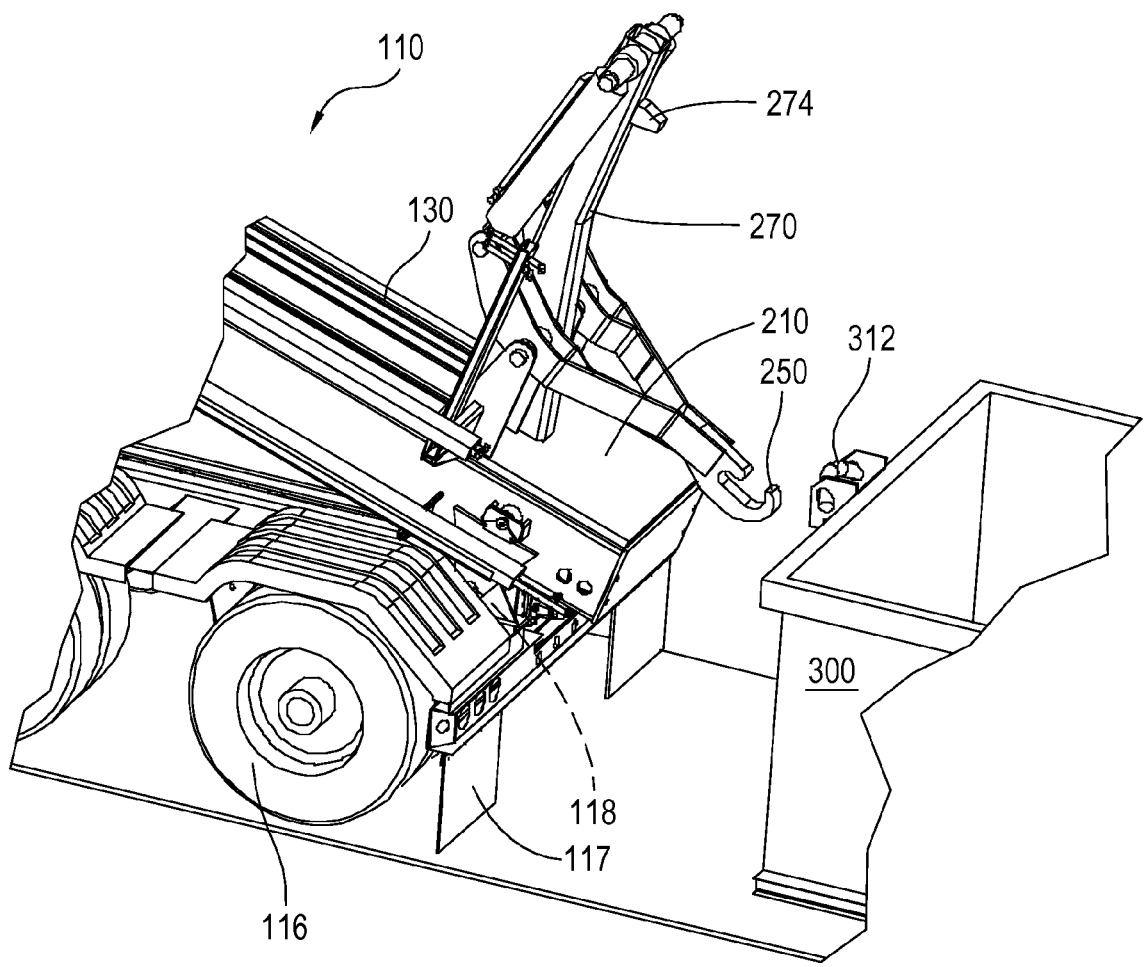
FIG. 2 is a zoomed in perspective view of the coupling point between the vehicle and the container of the FIG. 1 vehicle mounted lift system.
Figure 3:
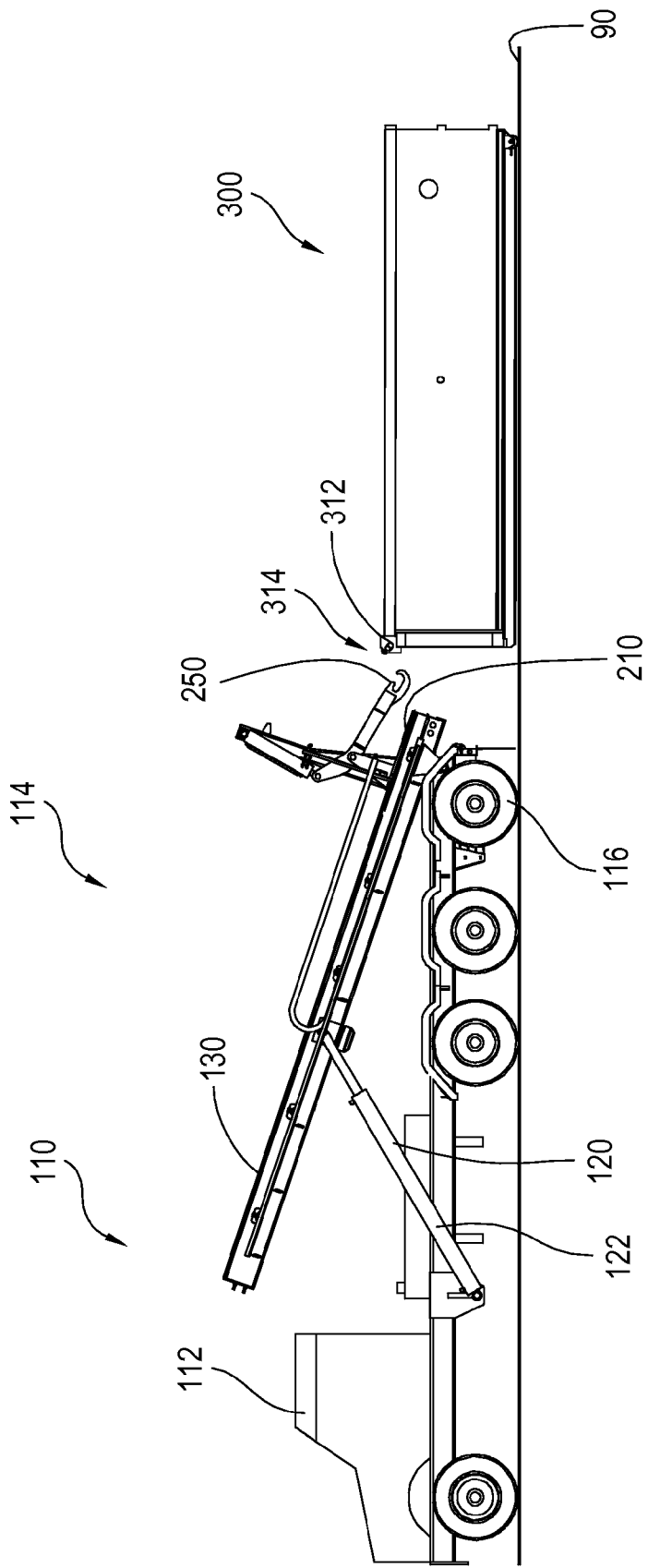
FIG. 3 is a side elevational view of the FIG. 1 vehicle mounted lift system.

Disclosed is vehicle mounted lift system 100 that may be used to load and unload a container such as a large trash receptacle. Referring to FIGS. 1-3, a vehicle mounted lift system (VMLS) 100 is illustrated, VMLS 100 generally includes vehicle 110 and container 300, which are both located on ground 90. For purposes of this disclosure, it is assumed that ground 90 is flat and level and that is how all the components are illustrated and disclosed. However, it should be understood that, in use, ground 90 may be uneven and/or may not be level. Adjustments in the use of the disclosed system based on ground conditions should be apparent to the user of the disclosed VMLS 100.

The illustrated vehicle 110 includes cab 112, trailer 114 and tiltable frame 130 located on trailer 114. Frame 130 and trailer 114 are coupled together at pivot point 118 (not illustrated) located near the rear of trailer 114. In addition, a pair of frame actuators 120 are mounted between trailer 114 and frame 130. In the illustrated embodiment, frame actuators 120 are hydraulic cylinders 122. Actuating hydraulic cylinders 122 permits frame 130 to be tilted up and down with respect to the trailer about pivot point 118. Carriage assembly 200, including carriage 210, with lifting hook 250 is movably mounted on frame 130 as described below.

The illustrated container 300 is a conventional type waste and recycling receptacle that includes lifting bar 312 that defines attachment point 314 for lifting hook 250 that is part of vehicle 110. For reference purposes, the illustrated container is approximately 21 feet, 2 inches long, approximately 5 feet, 3 inches tall and approximately 7 feet, 10 inches wide with an interior space of approximately 20 feet long, approximately 4 feet, 6 inches deep and approximately 7 feet, 4 inches wide. Illustrated container 300 may include one or more doors or gates on the rear end (not illustrated) to facilitate loading and/or unloading of container 300 with waste or other material. While the characteristics of container 300 are provided for reference purposes, they should not be understood to be limiting. The improved vehicle hook hoist disclosed herein can be used in conjunction with other types of containers, or objects, as desired.

In the configuration illustrated in FIGS. 1-3, the various components on vehicle 110 are oriented and arranged so that lifting hook 250 is in an appropriate position to engage lifting bar 312 on container 300 by simply backing vehicle 110 up a short distance. Once lifting hook 250 and lifting bar 312 are aligned, lifting hook 250 can be engaged with lifting bar 312 by either changing the amount of tilt of frame 130 relative to trailer 114 or by moving lifting hook 250 upwards as described below.

Figure 4:
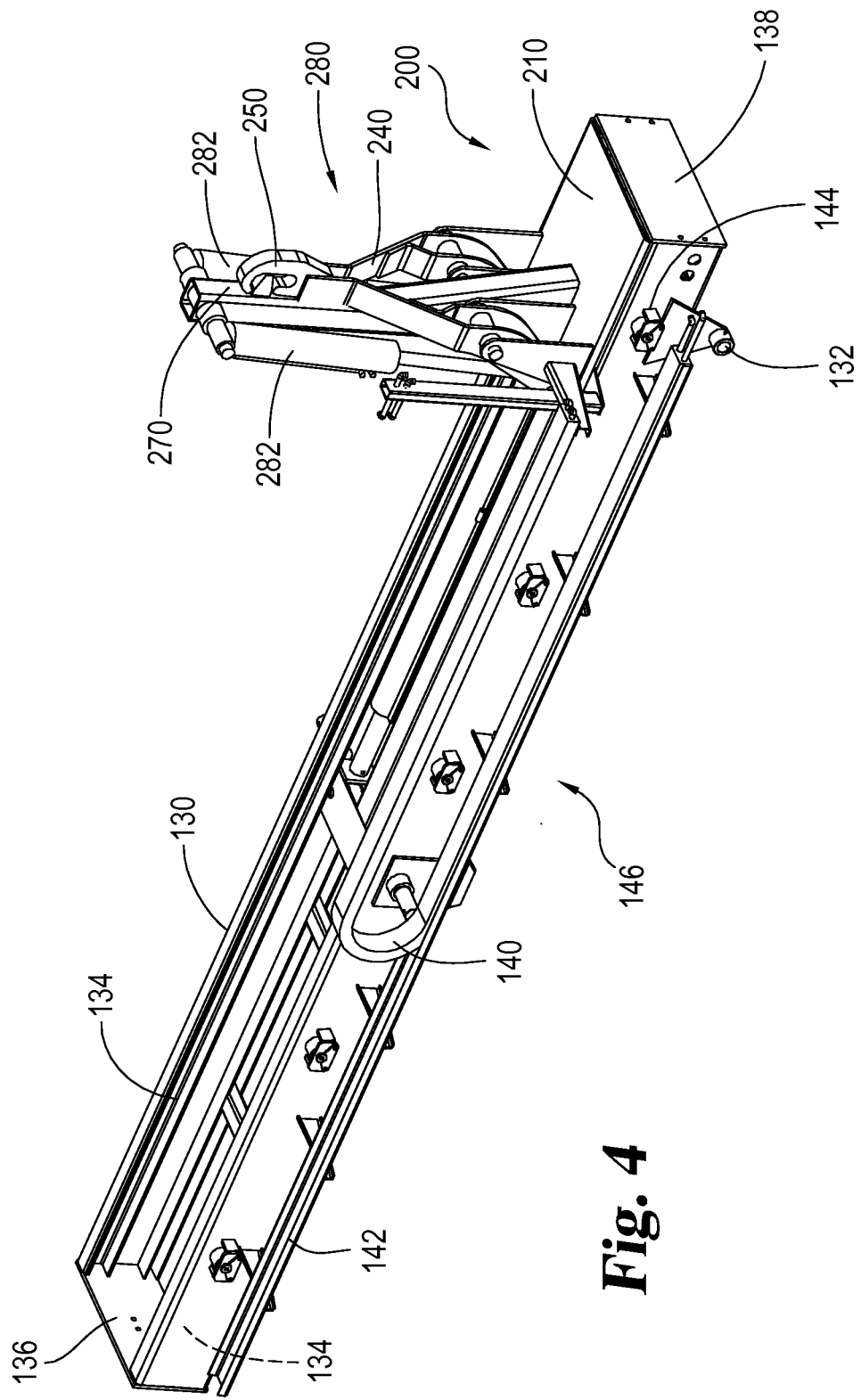
FIG. 4 is a perspective view of a frame, a component of the FIG. 1 vehicle.
Figure 6:
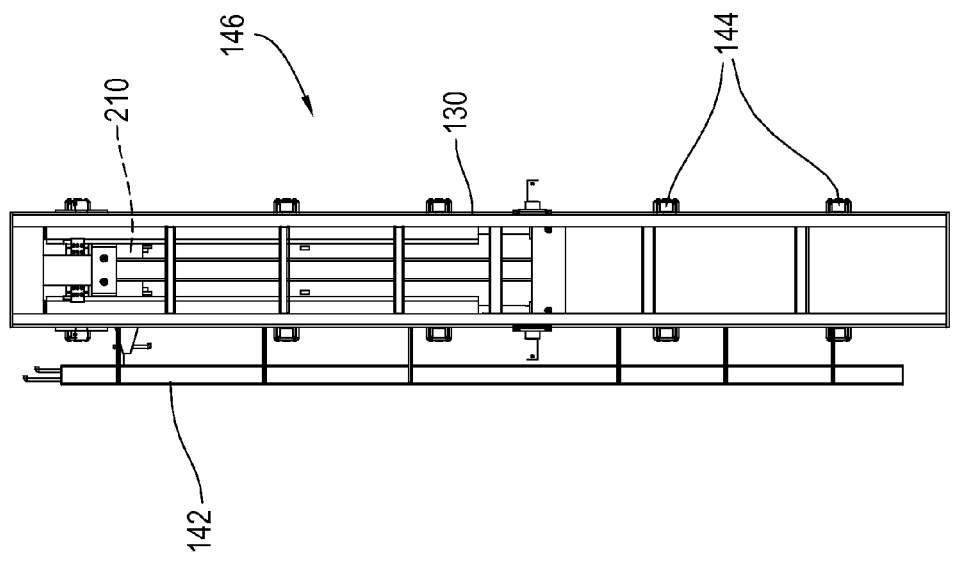
FIG. 6 is a bottom plan view of the FIG. 4 frame.
Figure 5:
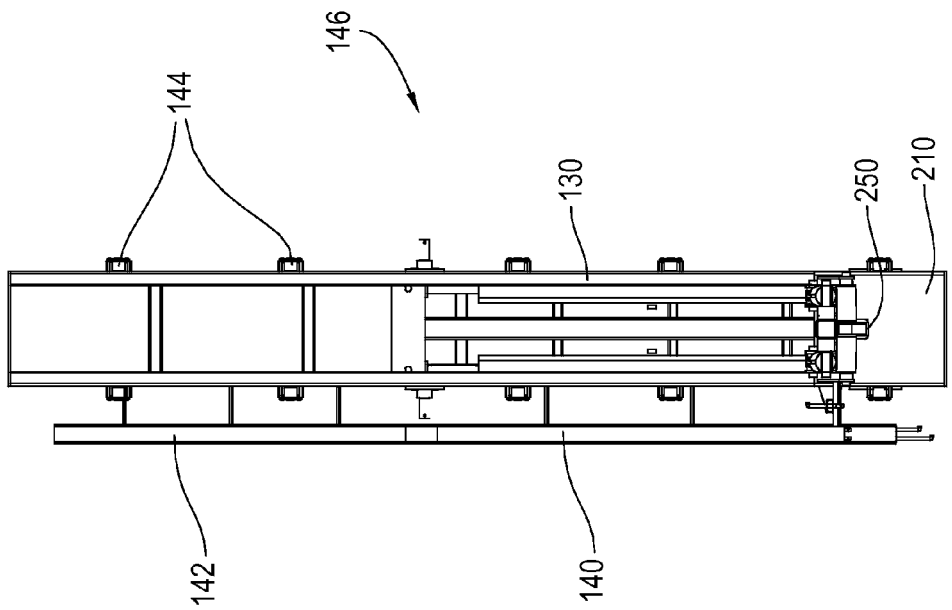
FIG. 5 is a top plan view of the FIG. 4 frame.

Referring now to FIGS. 4-6, frame 130 and carriage assembly 200 are illustrated in isolated detail. Frame 130 defines carriage track 134 that permits carriage 210 to traverse along the longitudinal length of frame 130. Frame 130 includes frame pivot 132 arranged to pivotally attach frame 130 on trailer 114 (at a corresponding pivot point 118 on trailer 114 that is not illustrated) as illustrated in FIGS. 1-3. Frame 130 also includes hose guide 140 and hose guide track 142 mounted to the side of frame 130 arranged to carry control lines (not illustrated) for actuating arm assembly 240 on carriage assembly 210 as described below. In the illustrated embodiment, hose guide 140 carries hydraulic lines (not illustrated).

Frame 130 also includes carriage actuator 146 that controls movement of the carriage assembly 200 along the length of carriage track 134. This is described below in greater detail in FIGS. 7-8. Frame 130 includes carriage track 134 on either side of frame 130 in which carriage 210 rides. Carriage tracks 134 permit longitudinally movement of carriage assembly 200 while preventing carriage 210 from moving in other directions and/or rotating.

Frame 130 also includes a plurality of container support rollers 144 that are arranged on either side of frame 130 to provide a low friction contact surface for container 300 to ride upon while container 300 is being loaded and unloaded from frame 130. This is described in greater detail below. Frame 130 also includes rear plate 138 and front plate 136.

Figure 7:
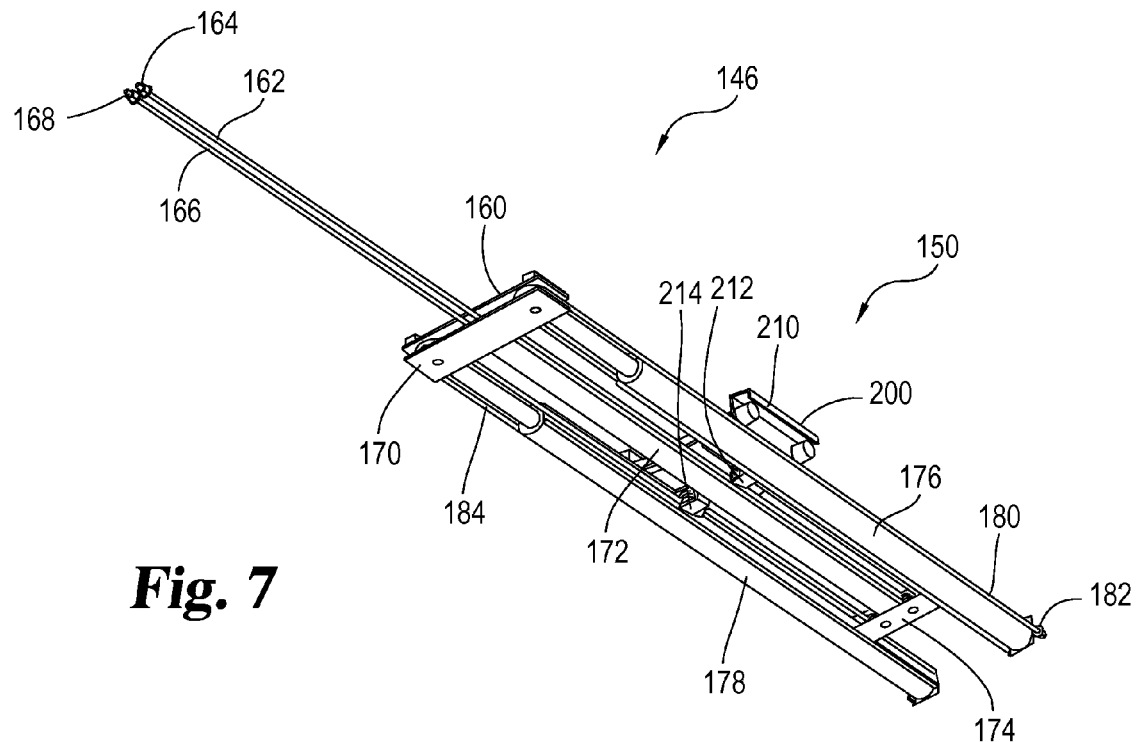
FIG. 7 is a bottom perspective view of a cable reeving system, a component of the FIG. 4 frame.
Figure 8:
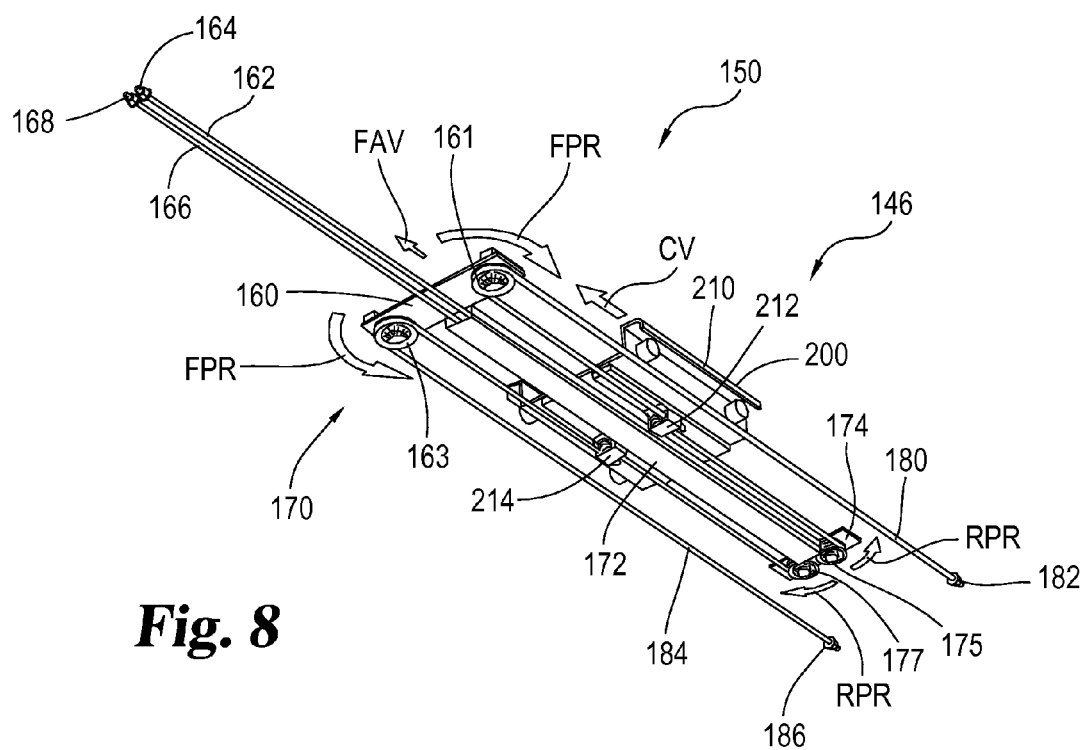
FIG. 8 is a bottom plan view of the FIG. 7 cable reeving system.

Referring now to FIGS. 7-8, an example carriage actuator 146 is illustrated in isolated detail with FIG. 7 illustrating actuators 176 and 178 mounted on cable reeving system 150 and FIG. 8 illustrating cable reeving system 150 without actuators 176 and 178 shown. In the illustrated embodiment, actuators 176 and 178 are hydraulic cylinders.

Carriage actuator 146 includes actuators 176 and 178, a pair of front cables 162 and 166, a pair of rear cables 180 and 184 and traveler assembly 170 that includes front assembly 160, spacing member 172 and rear assembly 174. Front assembly 160 includes forward pulleys 161 and 163 and rear assembly 174 includes rear pulleys 175 and 177. Carriage 210 includes flanges 212 and 214 to which front and rear cables 162, 166, 180 and 184 are attached. In the illustrated embodiment, actuators 176 and 178 are hydraulic cylinders that are coupled to frame 130 and are constructed and arranged to apply a force to the illustrated traveler assembly 170 to move carriage assembly 200 along the length of frame 130 between front plate 136 and rear plate 138 in either direction as described below.

Cables, as used herein, means and includes elongated tensile load bearing members (such as wire ropes, chains and non-wire ropes and cables) that are sufficiently flexible to be disposed as illustrated and used in conjunction with one or more pulleys while having sufficient tensile strength to move carriage assembly 200 while attached to container 300 holding a maximum rated load (for a particular system).

The ends of actuators 176 and 178 are attached to front assembly 160 of the traveler assembly 170 to apply force to cables 162, 164, 180 and 184. Traveler assembly 170 is supported in frame 130 and can travel forward and backward relative to frame 130. Traveler assembly 170 includes front assembly 160 connected to rear assembly 174 by spacing member 172.

As shown in FIG. 8, front cables 162 include forward attachment points 164 and 168 that are attached to frame 130 at front plate 136 with the second end of each cable being attached to flanges 212 and 214 on carriage assembly 200 after passing around rear pulleys 175 and 177 (on rear assembly 174). Similarly, rear cables 180 and 184 each includes attachment points 182 and 186 that are coupled to frame 130 at rear plate 138, with rear cables 180 and 184 passing around the forward pulleys 161 and 163 and with the opposite ends of the rear cables 180 and 184 attached to flanges 212 and 214 on carriage assembly 200.

Carriage assembly 200 is movable the full length of frame 130 between front plate 136 and rear plate 138 in response to movement of actuators 176 and 178 by moving traveler assembly 170 forward and backward with respect to frame 130. Forward movement of traveler assembly 170 generally results in the forward pulleys 161 and 163 actively pressing (and rotating) against rear cables 180 and 184. In response, rear cables 180 and 184 pull against both frame 130 and carriage assembly 200 in the same direction as the force applied by actuators 176 and 178 (towards the front end of frame 130). As frame 130 is comparatively immovable with respect to itself, a forward directed force applied by rear cables 180 and 184 causes carriage 210 to travel forward relative to frame 130.

Similarly, the rearward movement of traveler assembly 170 generally results in the rear pulleys 175 and 177 actively pressing (and rotating about) against front cables 162 and 166. In response, front cables 162 and 166 pull is against frame 130 and carriage assembly 200 in the same direction as the applied force (in this case, towards the rear of frame 130). This results in carriage 210 traveling rearwardly with respect to frame 130. Accordingly, the forward movement of traveler assembly 170 results in forward movement of carriage assembly 200 and rearward movement of traveler assembly 170 results in rearward movement of carriage assembly 200. With minimal friction associated with the rotation of the forward and rearward pulleys, the force applied to carriage assembly 200 is approximately half the force applied to the traveler assembly by actuators 176 and 178 (the other half of the force is applied to the front plate 136 and rear plate 138, which are held comparatively stationary).

As shown in FIG. 8, movement of traveler assembly 170 in the illustrated direction FAV (toward the front end of frame 130) results in the forward pulley rotating in the direction FRR and rear pulleys 175 and 177 rotating in the direction RPR. As a result, carriage assembly 200 is pulled in direction CV shown due to carriage assembly 200 being coupled to traveler assembly 170 through cables with a single pulley. Carriage assembly 200 moves approximately twice the distance that traveler assembly 170 moves when actuated by actuators 176 and 178.

Actuators 176 and 178, as depicted in FIG. 7, may be single stage hydraulic actuators with single piston rods moving in relation to a single piston cylinder. Alternatively, multi-stage hydraulic cylinders including three or more telescoping members, a piston rod, a piston and at least one hybrid piston disposed between the piston and the piston rod which functions like a piston with respect to the piston rod and functions like a piston rod with respect to the piston may be used.

The illustrated cable reeving system 150 may permit the use of single stage hydraulic cylinders as actuators 176 and 178 because the effective distance of movement of carriage assembly 200 can be twice the actuation length of individual actuators 280.

Figure 11:
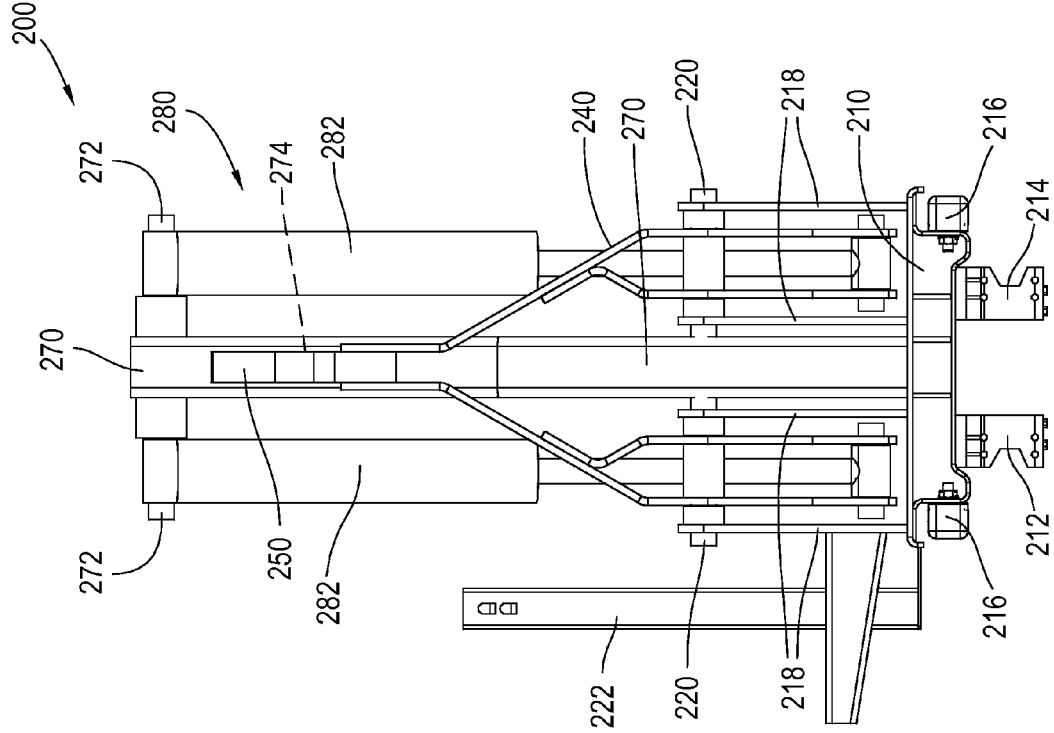
FIG. 11 is a front elevational view of the FIG. 9 carriage assembly.
Figure 13:
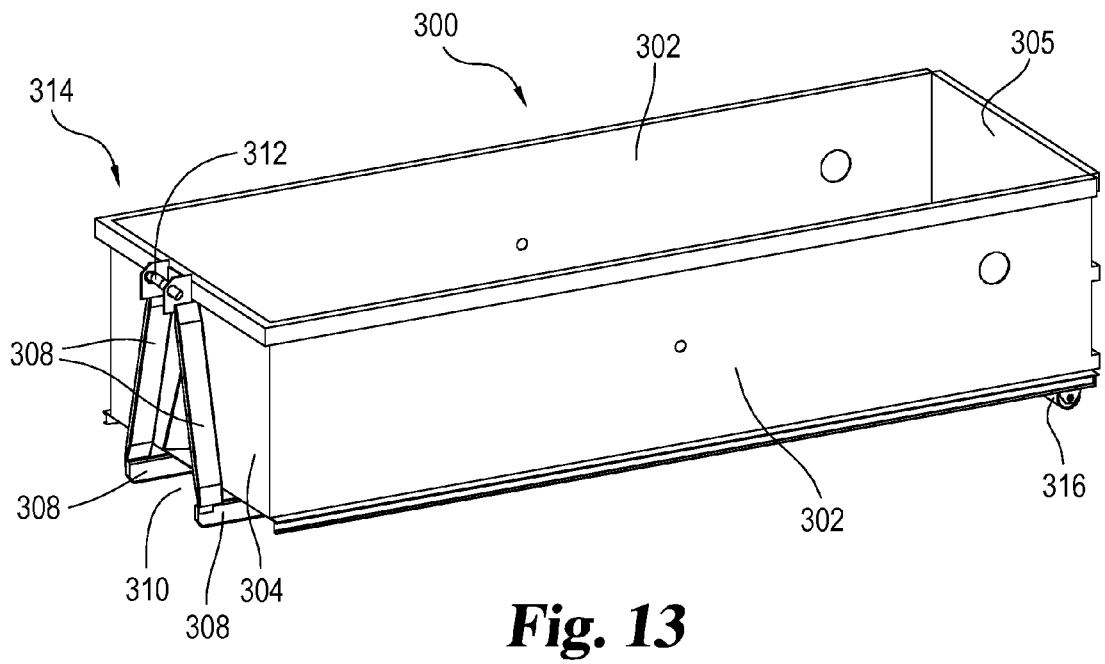
FIG. 13 is a perspective view of the container shown in FIG. 1.
Figure 14:
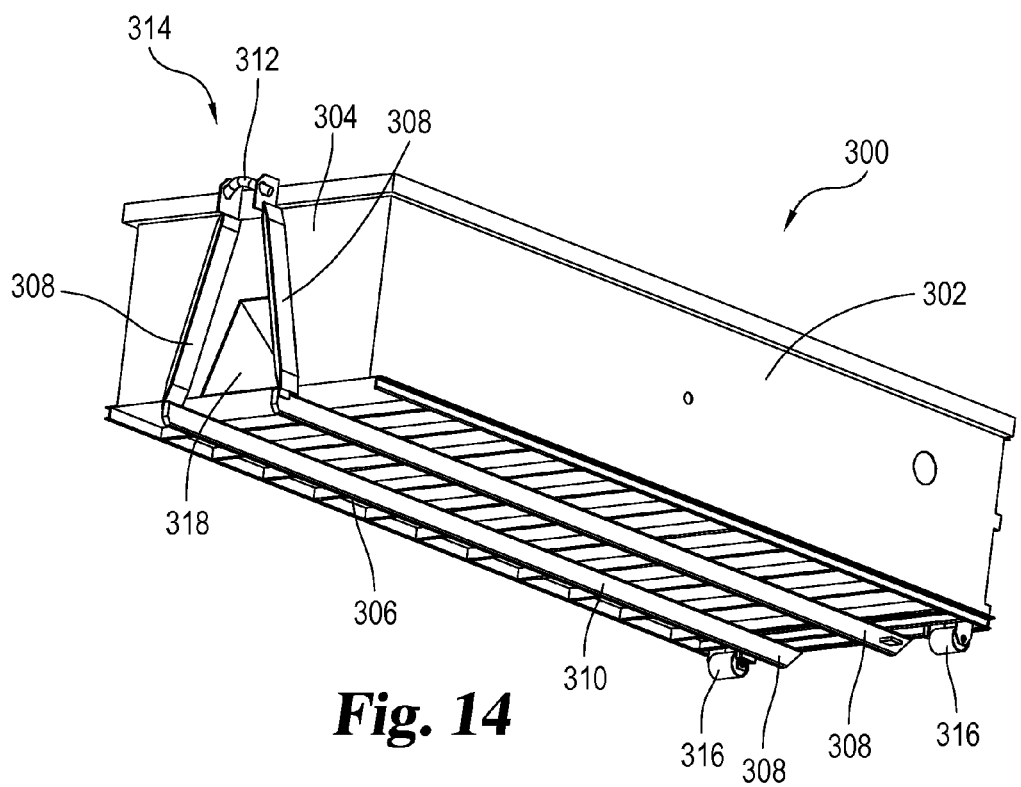
FIG. 14 is a bottom perspective view of the FIG. 13 container.
Figure 15:
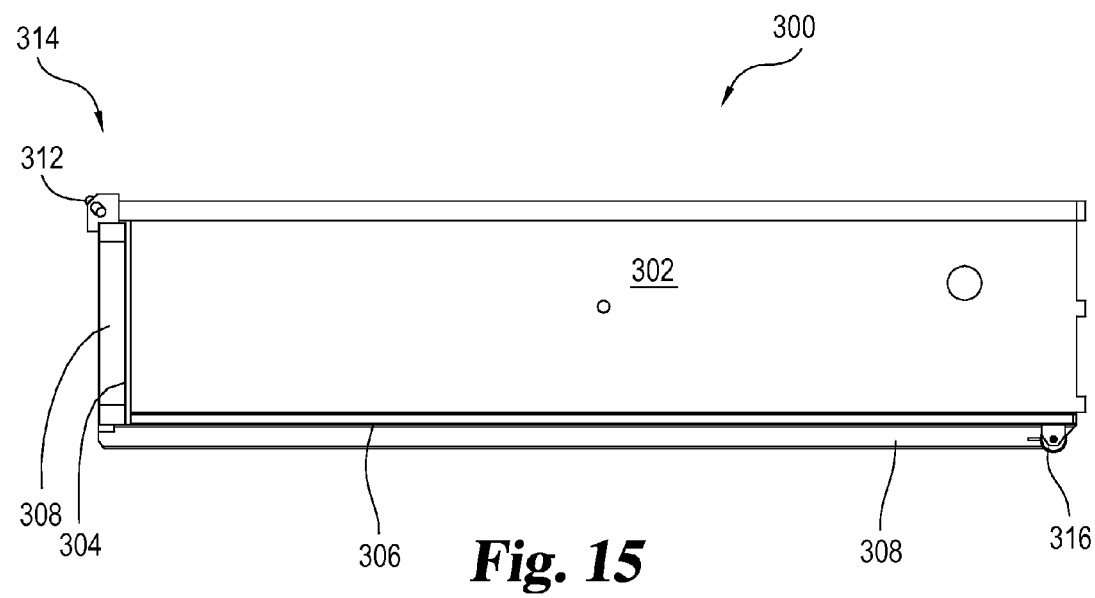
FIG. 15 is a side elevational view of the FIG. 13 container.
Figure 16:
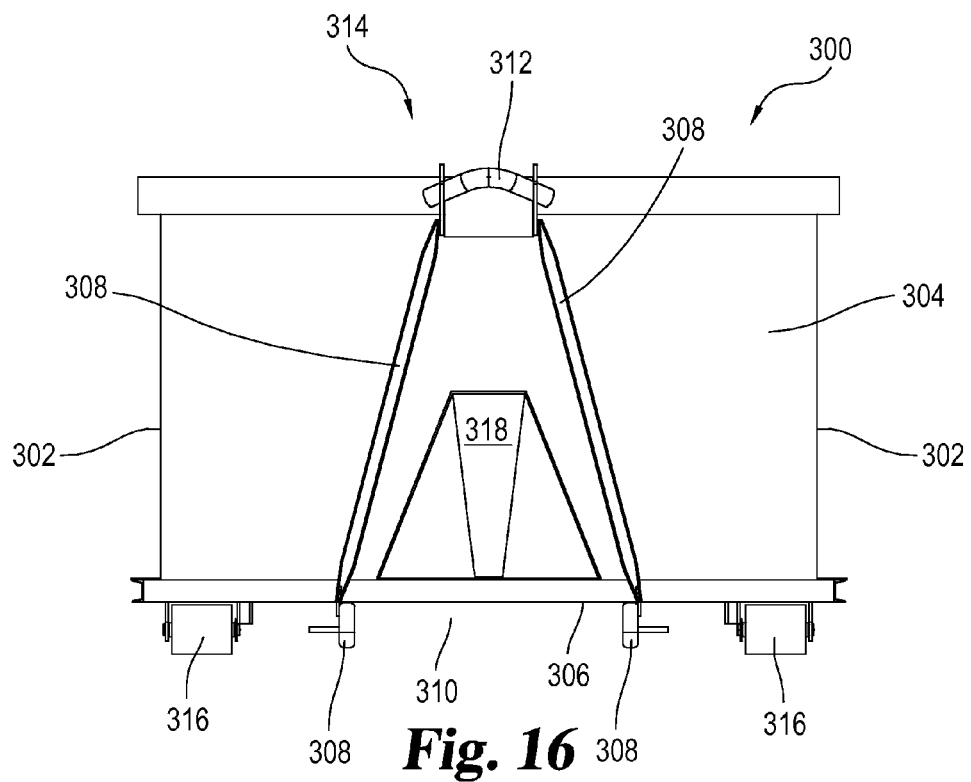
FIG. 16 is a front elevational view of the FIG. 13 container.
Figure 18:
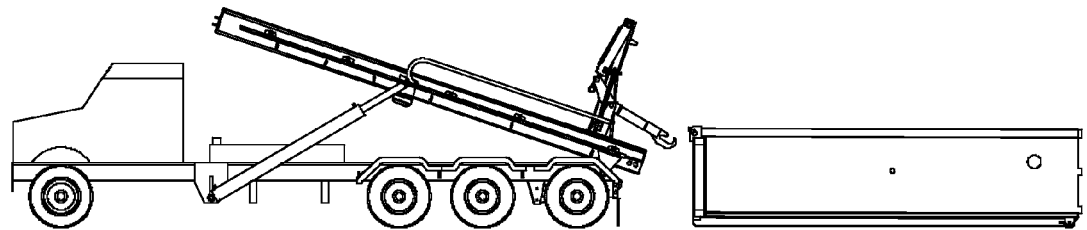
FIG. 18 is a side elevational view of the FIG. 1 vehicle and container illustrating a first step in loading the container onto the vehicle.
Figure 19:
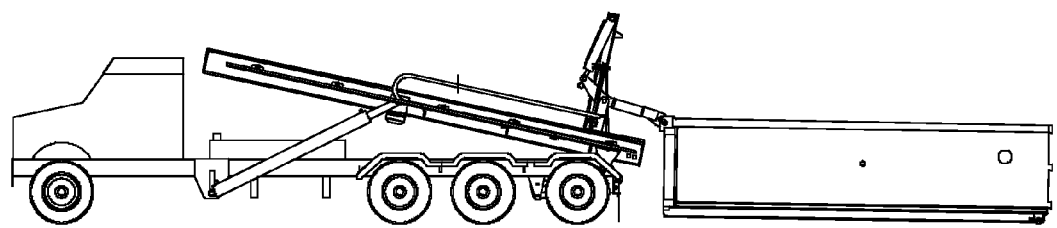
FIG. 19 is a side elevational view of the vehicle and container of FIG. 1 showing a second step in loading the container onto the vehicle.
Figure 20:
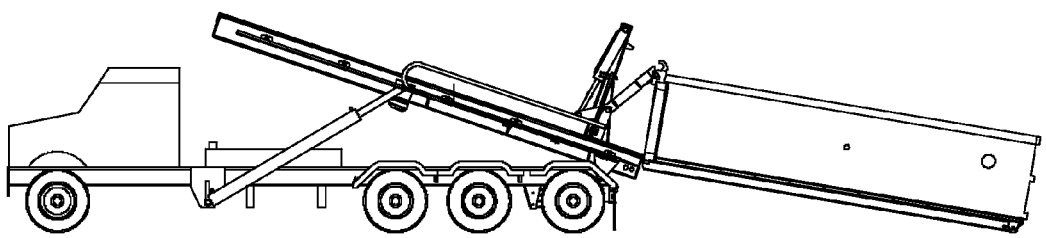
FIG. 20 is a side elevational view of the vehicle and container of FIG. 1 showing a third step in loading the container onto the vehicle.

Referring now to FIGS. 9-11, carriage assembly 200 is illustrated in isolated detail. Carriage assembly 200 includes carriage 210 with actuator support 270 and arm supports 218 extending above and away from carriage 210 and frame 130. Carriage assembly 200 includes arm assembly 240 and two actuators 280. In the illustrated embodiment, actuators 280 are hydraulic cylinders. Carriage assembly 200 also includes frame runners 216 on either side of carriage 210. The frame runners 216 are constructed and arranged to ride in carriage track 134 on frame 130. Carriage 210 also includes support assembly 222 that holds control lines for actuators 280. Actuator support 270 and arm supports 218 maintain a substantially constant angular orientation with respect to frame 130.

Figure 12:
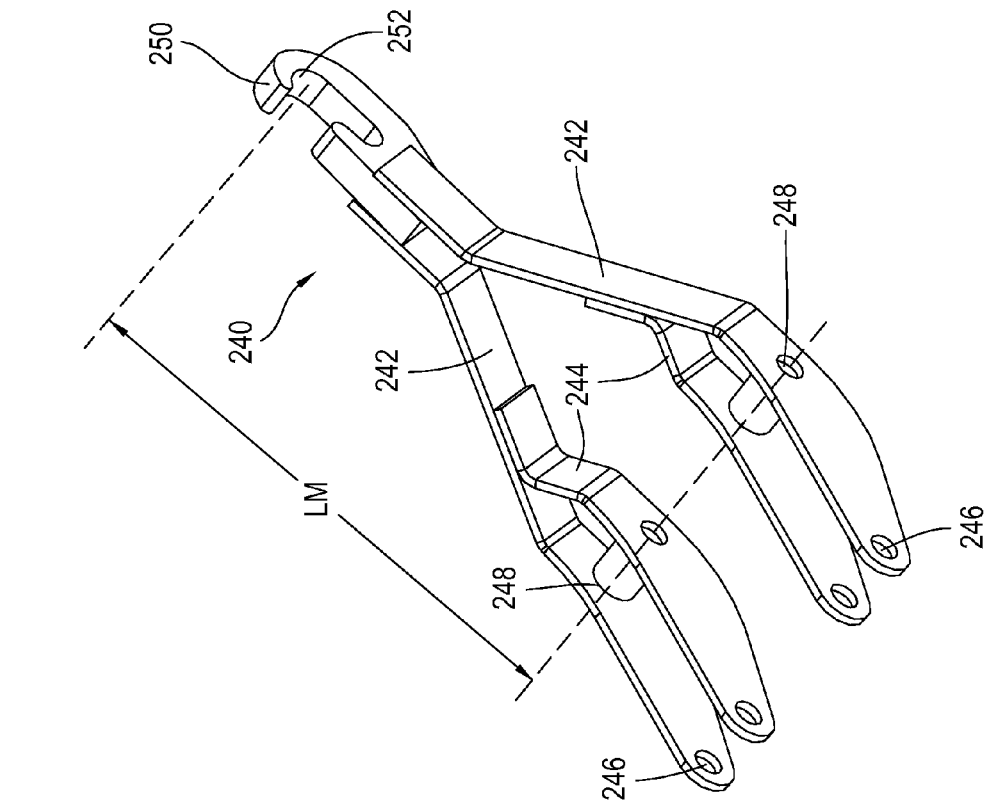
FIG. 12 is a perspective view of an arm assembly, a component of the FIG. 9 carriage assembly.

Arm assembly 240 is shown in FIG. 12. Arm assembly 240 includes a plurality of arm members including two outer arm members 242 and two inner arm members 244 connected together with lifting hook 250 as illustrated in FIG. 12. The plurality of arm members can be connected together by any method desired, including, but not limited to welding and mechanical fasteners. Arm assembly 240 may also comprise components that are integrally formed together, such as by casting. Arm assembly 240 defines attachment holes 246 that define part of actuator pivot 288 for actuators 280 and pivot holes 248 that define part of arm pivot 220 for arm assembly 240 on carriage assembly 200. Lifting hook 250 defines lifting surface 252 that is constructed and arranged to interface with lifting bar 312 on container 300.

As shown in FIGS. 9-11, arm assembly 240 is mounted on arm supports 218 at arm pivot 220. One end of arm assembly 240 includes lifting hook 250 with the other end of arm assembly 240 pivotally coupled to actuators 280 at actuator pivot 288. Actuators 280 are also pivotally coupled to the top of actuator support 270 at actuator pivot 272. Illustrated actuators 280 are hydraulic cylinders 282. The pivot couplings at arm pivot 220 and actuator pivot 288 may include any type of pivot coupling known in the art, including, but not limited to, a pin that passes through attachment holes 246 and pivot holes 248. The pivot couplings may optionally include bearings such as roller bearings or plain bearings.

The illustrated arm assembly 240 defines a bell crank type structure with two lever arms. The first lever arm is defined between arm pivot 220 and actuator pivot 288. The second lever arm is defined between lifting hook 250 and arm pivot 220. As arm assembly 240 pivots about arm pivot 220, the effective moment arm of the two levers change. Note that arm assembly 240 is bent at arm pivot 220; the bend increases the moment arm of actuator 280 with respect to arm pivot 220 when arm assembly 240 is in the illustrated position abutting actuator support 270.

The disclosed carriage assembly 200 includes discrete support structure for actuators 280 and arm assembly 240. In other embodiments, actuator support 270 and arm assembly 240 supports may optionally be integrated together, either as a partially integrated structure or as a unitary structure that extends from carriage 210. For example, in one embodiment, arm supports 218 closest to actuator support 270 could be integrated with actuator support 270 as a unitary structure with the outside arm supports 218 remaining discrete structures from actuator support 270. In another embodiment, arm supports 218, actuator support 270 and carriage 210 may be integrally formed together.

Actuator support 270 also defines projection 274 that is positioned to cooperate with lifting hook 250 to entrap lifting bar 312 on container 300 when arm assembly 240 is positioned as illustrated in FIG. 9 with arm assembly 240 rotated substantially completely toward actuator support 270 (at which point actuator support 270 physically blocks arm assembly 240 from rotating any further).

The illustrated arm assembly 240 defines lifting moment distance LM which is the longitudinal distance between pivot holes 248 on the arm and the center of curved lifting surface 252 on lifting hook 250. In the illustrated embodiment, lifting moment distance LM is between approximately 70% and approximately 75% of the height of container 300 that vehicle mounted lift system 100 is designed to be used with. In the illustrated embodiment, container 300 is approximately 63 inches tall and the longitudinal distance between pivot holes 248 and lifting surface 252 on the hook is approximately 46 inches. In alternate embodiments, for use with container 300 approximately 63 inches tall, the longitudinal distance between pivot holes 248 and lifting surface 252 on the hook may be as short as approximately 44 inches and as long as approximately 47 inches.

Actuators 280 disclosed in FIGS. 1-12 for actuating frame 130 with respect to trailer 114, carriage assembly 200 with respect to frame 130, and arm assembly 240 with respect to carriage assembly 200 are also disclosed in FIGS. 1-12 as hydraulic cylinders 122. In alternative embodiments, other types of linear actuators may be used, including, but not limited to, ball screws, roller screws, and pneumatic cylinders. In yet other embodiments, the disclosed linear actuators may be replaced by other types of actuators. For example, linear actuators that move arm assembly 240 with respect to carriage assembly 200 could be replaced by one or more rotary actuators.

Referring now to FIGS. 13-16, container 300 is illustrated. Container 300 is a rectangular box-like structure with bottom surface 306, two side walls 302, end walls 304 and 305 and bottom surface 306 with lifting bar 312 attached to end wall 304 and a pair of supports 308 extending down end wall 304 and another pair of supports 308 extending along bottom surface 306. Supports 308 extending along the bottom of container 300 defines a support recess 310 that is constructed and arranged to fit around frame 130 such that the supports 308 extending along the bottom of container 300 ride on container support rollers 144 on frame 130 with the top portion of frame 130 being positioned between supports 308 in support recess 310. Container 300 also optionally includes rollers 316 on the bottom, opposite lifting bar 312, that permits the end of container 300 to roll along ground 90 with reduced friction. End wall 304 also defines an optional recess 318 that extends into the space defined by side walls 302, end wall 304 and bottom surface 306. End wall 305 of container 300 (above the pair of rollers 316) may optionally include one or more swing doors, a hatch or a swinging gate (not illustrated), to aid in loading and unloading material inside container 300.

Referring to FIG. 17, carriage assembly 200 is illustrated in a side view in two configurations, one with arm assembly 240 fully extended and the other with arm assembly 240 fully retracted (based on the range of motion permitted by the illustrated structure and the maximum extension of actuators 280). In the illustrated embodiment, arm assembly 240 is constructed and arranged to rotate through a rotation arc AR of approximately 100 degrees. In another embodiment, the arm is constructed and arranged to rotate through a rotation arc AR not greater than approximately 110 degrees.

Referring now to FIGS. 18-24, a series of seven sequential illustrations of loading container 300 onto vehicle 110 and then dumping the contents of container 300 using the disclosed vehicle mounted lift system 100 is shown. In step 1, shown in FIG. 18, the vehicle is positioned near container 300 with frame 130 elevated, carriage assembly 200 moved fully rearward and arm assembly 240 fully extended. In step 2, shown in FIG. 19, the vehicle is moved closer to container 300, lifting hook 250 is engaged with lifting bar 312 on container 300, and frame 130 is lowered slightly (thereby raising lifting hook 250), fully engaging the hook on lifting bar 312. In step 3, shown in FIG. 20, arm assembly 240 is rotated through a portion of its range of movement, lifting the end of container 300 off ground 90 with bottom surface 306 of container 300 about to pass above rear plate 138 or frame 130.

Figure 21:
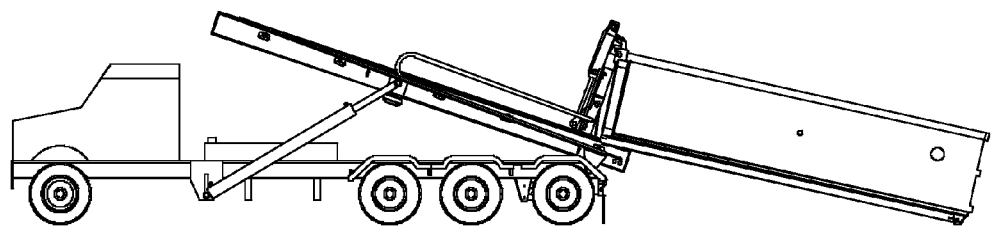
FIG. 21 is a side elevational view of the vehicle and container of FIG. 1 showing a fourth step in loading the container onto the vehicle.

In step 4, shown in FIG. 21, arm assembly 240 is rotated through its full range of motion to abut actuator support 270 with projection 274 entrapping lifting bar 312 in lifting hook 250. The bottom surface 306 of container 300 is positioned over the rear edge of frame 130 with a portion of frame 130 positioned in support recess 310. Note that container 300 is loaded onto frame 130 without raising the bottom of container 300 significantly above the top surface of frame 130. This helps to minimize the amount that container 300 is tilted while being loaded.

Figure 22:
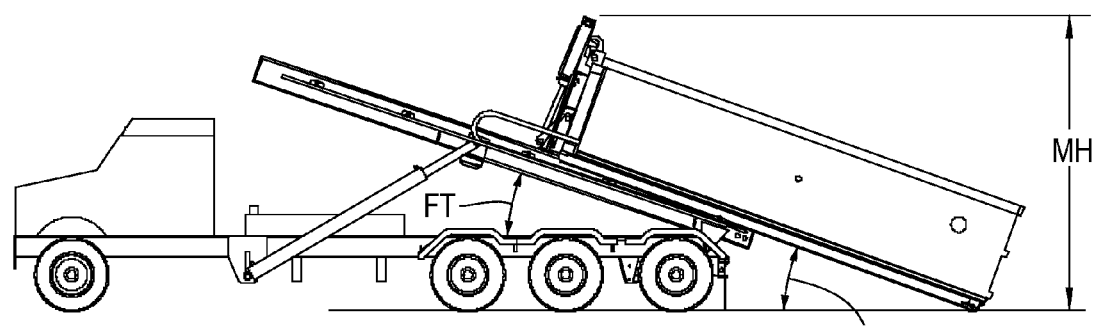
FIG. 22 is a side elevational view of the vehicle and container of FIG. 1 showing a fifth step in loading the container onto the vehicle.

In step 5, shown in FIG. 22, carriage assembly 200 is moved approximately halfway up frame 130 to the point that rollers 316 on container 300 are almost lifted off ground 90. This represents the maximum overhead height MH required during loading of the illustrated container 300. In the illustrated embodiment, with the above described container 300, maximum overhead height MH required during loading is approximately 14 feet, 1 inch. This is substantially lower than some prior art systems. After reaching the stage shown in step 5, frame 130 can be lowered to trailer 114 before moving carriage 210 further along frame 130, making step 5 the maximum overhead height required to load the illustrated container 300.

Step 5 also illustrates the maximum container tilt MCT required to load the illustrated container 300. In the illustrated embodiment, the maximum container tilt MCT required to load the illustrated container 300 is less than approximately 15 degrees. This is a significant performance characteristic because the greater the amount of tilt required, the less fully loaded container 300 can be during loading. If container 300 is tilted too much, materials in container 300 may spill out over end wall 305.

Figure 23:
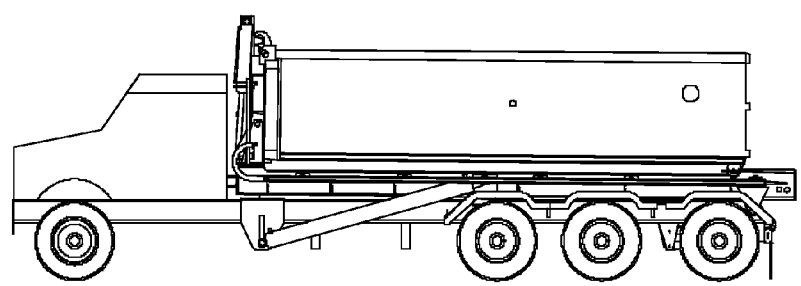
FIG. 23 is a side elevational view of the vehicle and container of FIG. 1 showing a container loaded onto the vehicle.
Figure 24:
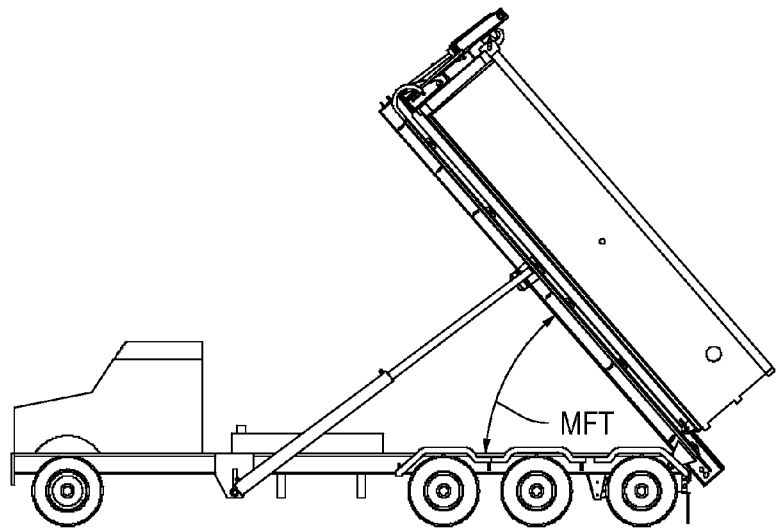
FIG. 24 is an elevational view of the vehicle and container of FIG. 1 showing a container loaded onto the vehicle in a position to off load the contents of the container.

In step 6, shown in FIG. 23, carriage assembly 200 has been moved fully forward, positioning container 300 on frame 130 and trailer 114. Upon securing everything for safety, the vehicle can now be driven to a location where container 300 is either emptied and/or offloaded from trailer 114. In step 7, shown in FIG. 24, vehicle mounted lift system 100 is shown with frame 130 fully raised above trailer 114 at maximum tilt angle MFT of approximately 49 degrees. This may be sufficient to offload material located in container 300 by gravity through the door, gate or hatch in the rear of container 300 (while optionally moving vehicle 110 forward).

Figure 25:
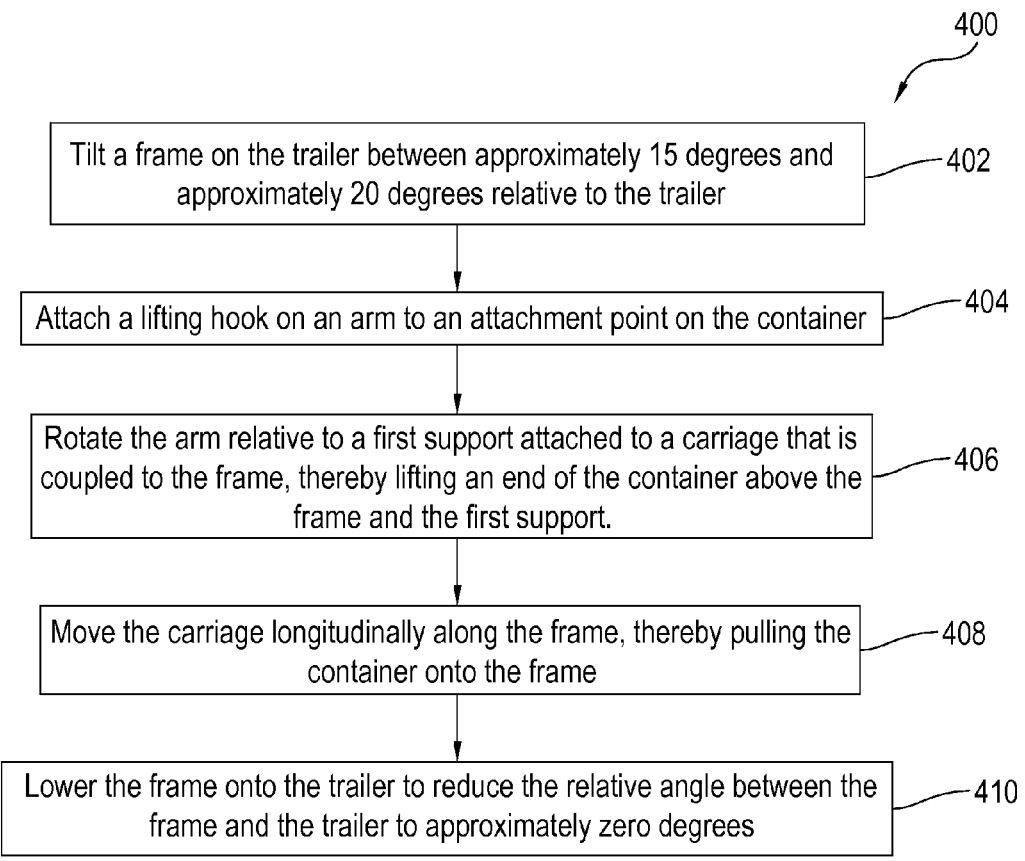
FIG. 25 illustrates a method of loading a container onto a vehicle trailer.

Referring to FIG. 25, a method of loading container 300 onto trailer 114 on vehicle 110 is illustrated. The illustrated method tracks portions of the steps illustrated in FIGS. 18-24. The method begins by tilting frame 130 on trailer 114 between approximately 15 degrees and approximately 20 degrees relative to trailer 114. Then, while frame 130 is tilted between approximately 15 degrees and approximately 20 degrees, lifting hook 250 on an arm is attached to attachment point 314 on container 300. Then, again while frame 130 remains tilted between approximately 15 degrees and approximately 20 degrees, rotating the arm relative to a first support 308 attached to carriage 210 that is coupled to frame 130, thereby lifting an end of container 300 above frame 130 and first support 308. This is followed by moving carriage 210 longitudinally along frame 130, thereby pulling container 300 onto frame 130. Finally, frame 130 is lowered onto trailer 114 to reduce the relative angle between frame 130 and trailer 114 to approximately zero degrees.

An advantage of vehicle mounted system 100 disclosed above is that it can lift container 300 onto vehicle 110 without extending or using any added stabilizing structure other than the tires on vehicle 110. Other prior art vehicle mounted lifting systems 100 require added structures that are extended into contact with ground 90 to provide a surface for container 300 to ride upon, such as a ramp, and/or to stabilize vehicle 110 during loading to prevent the front of vehicle 110 from being lifted up during container 300 loading due to the weight of container 300 when container 300 is off-set from the back end of vehicle 110. The disclosed system minimizes the offset distance between rear wheels 116 and container 300 during loading, thereby reducing the tendency of the front of vehicle 110 to lift up during container 300 loading. In addition, the disclosed lift does not require a ramp structure for container 300, thus eliminating a component common on prior art systems.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:
1. A vehicle-mounted lift system for use with a vehicle including a trailer with a pair of wheels proximate to a back end of the trailer, the lift system for use with a container including a height, a length and an attachment point, the lift system comprising:
a frame coupled to the trailer, the frame including first and second opposing ends defining a length, wherein said frame defines a longitudinally direction along its length;
a carriage coupled to said frame and constructed and arranged to longitudinally move along said frame;
a first support defining an arm pivot point, wherein said first support is attached to said carriage with said arm pivot point positioned above and spaced apart from said carriage and said frame;
an arm including a first end, a second end opposite said first end and a coupling portion rotatably attached to said first support at said arm pivot point, wherein said coupling portion defines a center of rotation of said arm relative to said carriage;

a lifting hook attached to said first end of said arm, wherein said lifting hook is constructed and arranged to engage the attachment point on the container and wherein said lifting hook defines a lifting surface that is constructed and arranged to abut the attachment point on the container;

an actuator constructed and arranged to rotate said arm angularly with respect to said first support about said arm pivot point thereby moving the relative position of said lifting hook;

a second support including a top portion and a bottom portion attached to said carriage with said top portion of said first support extending above and spaced apart from said carriage and said frame; and a projection on said second support constructed and arranged to cooperate with said lifting hook to entrap the attachment point on the container between said projection and said hook when said arm is rotated substantially completely toward said second support.

2. The vehicle-mounted lift system of claim 1, wherein said first support is constructed and arranged to maintain a substantially constant angular orientation with respect to said frame.

3. The vehicle-mounted lift system of claim 1, wherein said carriage is movable in the longitudinal direction along the length of said frame between the first and second opposing ends.

4. The vehicle-mounted lift system of claim 1, wherein said frame is pivotally coupled to the trailer with a frame pivot positioned proximate to the back end of the trailer.

5. The vehicle-mounted lift system of claim 1, wherein said actuator is a linear actuator coupled between said top portion of said second support and said second end of said arm.

6. The vehicle-mounted lift system of claim 5, wherein said linear actuator is selected from the group consisting of: a ball screw, a roller screw, a hydraulic cylinder and a pneumatic cylinder.

7. The vehicle-mounted lift system of claim 5, wherein said linear actuator is a hydraulic cylinder.

8. The vehicle-mounted lift system of claim 1, wherein a longitudinal distance between said coupling portion on said arm and said lifting surface on said lifting hooks is less than a vertical distance between the attachment point and a bottom surface of the container that the vehicle-mounted lift system is constructed and arranged to be used with.

9. The vehicle-mounted lift system of claim 1, wherein a longitudinal distance between said coupling portion on said arm and said lifting surface on said lifting hooks is between approximately seventy percent and approximately seventy-five percent of the vertical distance between the attachment point and a bottom surface of the container that the vehicle-mounted lift system is constructed and arranged to be used with.

10. The vehicle-mounted lift system of claim 1, wherein said arm is constructed and arranged to rotate through an angle not greater than 110 degrees.

11. The vehicle-mounted lift system of claim 1, wherein said arm is constructed and arranged to rotate through an angle of approximately 100 degrees.

12. The vehicle-mounted lift system of claim 1, wherein the vehicle-mounted lift system is constructed and arranged to lift the container onto the trailer without raising a bottom surface of the container significantly above a top surface of said frame.

13. The vehicle-mounted lift system of claim 1, wherein said frame, said carriage, said first support, said arm and said lifting hook are adapted to load the container from flat ground onto the frame of the container while the frame is tilted at most approximately 20 degrees relative to the trailer at any time while loading the container onto the truck.

14. A method of using the vehicle-mounted lift system of claim 1 to load a container onto a trailer on a vehicle, the method comprising:

tilting the claim 1 frame on the trailer between approximately 15 degrees and approximately 20 degrees relative to the trailer;

while the frame is tilted between approximately 15 degrees and approximately 20 degrees, attaching the claim 1 lifting hook on the claim 1 arm to an attachment point on the container;

while the frame is tilted between approximately 15 degrees and approximately 20 degrees rotating the arm relative to the first support attached to the carriage that is coupled to the frame, thereby lifting an end of the container above the frame and the first support;

moving the claim 1 carriage longitudinally along the frame, thereby pulling the container onto the frame;

lowering the frame onto the trailer to reduce the relative angle between the frame and the trailer to approximately zero degrees.

15. The method of claim 14, wherein the arm is rotated through an angle less than 110 degrees when lifting the end of the container above the frame and the first support.

16. The method of claim 14, wherein the arm is rotated through an angle of approximately 100 degrees when lifting the end of the container above the frame and the first support.

17. The method of claim 14, wherein, when lifting the end of the container above the frame and the first support, the container is not raised significantly above the frame.

18. The method of claim 14, wherein the container is not tilted more than 20 degrees relative to the earth at any time while loading the container onto the truck.

19. The method of claim 14, wherein, while loading the container onto the trailer on the vehicle, no stabilizing structure is engaged with the earth to provide support for the trailer other than tires on the vehicle.

* * * * *